(12) United States Patent
Wakamatsu et al.

(10) Patent No.: US 6,697,609 B2
(45) Date of Patent: Feb. 24, 2004

(54) CARRIER REPRODUCING APPARATUS AND METHOD OF THE SAME

(75) Inventors: Masataka Wakamatsu, Kanagawa (JP); Takeshi Yamaguchi, Fukuoka (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 09/736,815

(22) Filed: Dec. 14, 2000

(65) Prior Publication Data

US 2001/0046847 A1 Nov. 29, 2001

(30) Foreign Application Priority Data

Dec. 16, 1999 (JP) .......................... P11-358116

(51) Int. Cl.$^7$ ................................. H04B 1/06
(52) U.S. Cl. .................. 455/260; 455/63.1; 455/67.13; 455/314; 455/337; 375/326; 375/327
(58) Field of Search ............................ 455/63.1, 67.11, 455/67.13, 226.1, 226.3, 255, 258, 260, 296, 313, 314, 334, 339, 337; 375/320, 322, 324, 327, 329, 338, 346, 348, 350, 326

(56) References Cited

U.S. PATENT DOCUMENTS

| | | | | | |
|---|---|---|---|---|---|
| 4,309,674 | A | * | 1/1982 | Owen | 455/127.3 |
| 5,881,110 | A | * | 3/1999 | Cochran | 375/324 |
| 6,018,556 | A | * | 1/2000 | Janesch et al. | 375/326 |
| 6,597,754 | B1 | * | 7/2003 | Janesch et al. | 375/327 |

* cited by examiner

Primary Examiner—Quochien Vuong
(74) Attorney, Agent, or Firm—Frommer Lawrence & Haug LLP; William S. Frommer

(57) ABSTRACT

A carrier reproducing apparatus and method enabling stable operation even at a low S/N, wherein, when phase signals are locked and exceed a predetermined value, a tracking circuit generates a signal and an oscillation frequency of a signal output from a numerical control oscillation circuit is controlled so that the phase signals do not exceed the predetermined value and wherein a down sampling circuit and an interpolation circuit convert signals having a frequency of more than twice the symbol rate to signals having a frequency of twice the symbol rate.

11 Claims, 3 Drawing Sheets

CARRIER REPRODUCING APPARATUS AND METHOD OF THE SAME

BACKGROUND OF THE INVENTION

1. Field of the Invention

The present invention relates to a carrier reproducing apparatus and method used in an for demodulating for a digitally modulated signal used in satellite communication, satellite broadcasting, etc.

2. Description of the Related Art

Satellite communication networks are configured based on so-called multiple access, that is, use of one or more satellite-mounted repeater for setting communication paths simultaneously among a plurality of ground stations.

There are a variety of methods for how to divide communication paths for multiple access. Frequency division multiple access (FDMA) is one of them.

As one type of the FDMA, there is the single channel per carrier (SCPC) system wherein each communication path is comprised of one line.

In SCPC, each carrier is sent to a satellite modulated by a single channel. In the past, FM modulation, digital PSK modulation, etc. have been used. SCPC is advantageous in the points that requests can be easily assigned and use may be made of voice activation, i.e., setting a threshold value at the voice level, considering voice communication to not be performed while the threshold value is not exceeded, and cutting a sending carrier instantaneously at every such instant. This enables an improvement in the, efficiency of use of the relays. SCPC is very efficient in terms of system efficiency and flexibility in a network having a large number of low-traffic ground stations.

However, since a large number of carriers are commonly amplified and the symbol rate is a low several M symbols per second (MSPS), there is the disadvantage of a large effect of the intermodulation product and difficulty of carrier pull-in at the time of demodulation.

As one technique for solving such a problem, for example, there is the demodulation circuit for a digital modulation wave disclosed in Japanese Unexamined Patent Publication (Kokai) No. 6-120992.

In this demodulation circuit, the carrier is reproduced using two feedback loops. Specifically, an internal feedback loop (Costas loop) performs frequency pull-in and phase synchronization based on a phase of the received signal. Also, an external feedback loop detects frequency error in the internal frequency loop and continuously controls the system to suppress that frequency error and performs frequency pull-in and phase synchronization discontinuously using an offset value when a locked state of the internal feedback processing is released. As a result, it is possible to shorten the time from when the locked state of the internal feedback processing is released until when it becomes locked next.

Summarizing the problem to be solved by the invention, since the demodulation circuit for a digital demodulation wave disclosed in the above Japanese Unexamined Patent Publication (Kokai) No. 6-120992 detects frequency error in the internal feedback loop, there is the disadvantage that the operation becomes unstable at the time of a low S/N.

Also, since external feedback processing is always performed, there is the disadvantage that the frequency pull-in and phase synchronization become unstable in relation with the internal feedback processing.

Furthermore, it is necessary to operate a roll-off filter at a high frequency the same as an A/D conversion circuit before the external feedback loop (frequency of at least twice symbol rate), so the roll-off filter becomes complex and large in size.

SUMMARY OF THE INVENTION

An object of the present invention is to provide a carrier reproducing apparatus and method enabling stable operation at the time of a low S/N.

Another object of the present invention is to provide a carrier reproducing apparatus and method enabling a simple and small configuration.

To attain the above objects, according to a first aspect of the present invention, there is provided a carrier reproducing apparatus for reproducing the carrier of a received signal, comprising a first multiplying circuit for multiplying the received signal with a first feedback signal; a filter circuit for filtering a signal output from the first multiplying circuit to remove a signal component having a frequency adjacent to carrier frequency; a second multiplying circuit for multiplying the filtered signal with a second feedback signal; a phase detection circuit for detecting a phase of a signal output from said second multiplying circuit and generating a phase signal; a first numerical control circuit for generating said second feedback signal having an oscillation frequency in accordance with said phase signal; a lock detection circuit for detecting a locked state of a phase of the signal output from said second multiplying circuit based on said phase signal; a second numerical control oscillation circuit for generating said first feedback signal having an oscillation frequency in accordance with a third signal; and a tracking circuit for controlling said third signal so that said phase signal does not exceed a predetermined value when a phase of the signal output from said second multiplying circuit is locked and the phase signal exceeds said predetermined value.

The mode of operation of the carrier reproducing apparatus according to the first aspect of the present invention are as follows.

A first feedback loop is comprised of the second multiplying circuit, phase detection circuit, and first numerical control circuit.

A second feedback group is comprised by the first multiplying circuit, filter circuit, tracking circuit, and second numerical control circuit.

In the lock detection circuit, a locked state of a phase of the signal output from the second multiplying circuit, that is, a locked state of the first feedback loop, is detected based on a phase signal generated by the phase detection circuit.

In the tracking circuit, a third signal input to the second numerical control circuit is controlled so that the phase signal does not exceed a predetermined value when a phase of the signal output from the multiplying circuit is locked and the phase signal exceeds the predetermined value.

As explained above, in the carrier reproducing apparatus of the first aspect of the present invention, since the third signal input to the second numerical control circuit is controlled when the first feedback loop is locked, frequency pull-in and phase synchronization in the first feedback loop can be stabilized.

Preferably, the apparatus further comprises a loop filter circuit for filtering out a high-band component of said phase signal; said first numerical control circuit generates said second feedback signal having an oscillation frequency in accordance with the phase signal from which the high-band component is removed; and said tracking circuit, when a phase of the signal output from said second multiplying circuit is locked and the phase signal wherein the high-band component is removed exceeds a predetermined value, controls said third signal so that the phase signal from which the high-band component was removed does not exceed said predetermined value.

Preferably, said tracking circuit increments or decrements a value indicated by said third signal.

Alternatively, preferably the apparatus further comprises an offset setting circuit for generating said third signal by using a predetermined offset value when a phase of the signal output from said second multiplying circuit becomes unlocked.

Preferably, when a phase of the signal output from said second multiplying circuit becomes unlocked due to an interruption of said received signal or an operation for selecting a station, said tracking circuit holds a control state of said third signal immediately before unlocking and controls said third signal based on said held control state when said received signal is recovered or said operation for selecting a station is completed.

Alternatively, when a phase of the signal output from said second multiplying circuit becomes unlocked to an interruption of said received signal or an operation for selecting a station, said offset setting circuit holds said offset value used immediately before the unlocked state and controls said third signal using said held offset value when said received signal is recovered or said operation for selecting a station is completed.

Alternatively, preferably said apparatus further comprises an A/D conversion circuit for converting said received signal from an analog to digital format, and said first multiplying circuit multiplies said received signal after said A/D conversion with said first feedback signal.

According to a second aspect of the present invention, there is provided a carrier reproducing apparatus for reproducing a carrier of a modulated received signal, comprising an A/D conversion circuit for sampling said received signal at a frequency of at least n (n>2) times a symbol rate of said modulation; a first filter circuit for filtering said sampled received signal to remove a signal component having a frequency adjacent to carrier frequency; a down sampling circuit for thinning said filtered signal; an interpolation circuit for interpolation by said thinned signal to generate a signal having a frequency of n times said symbol rate; a multiplying circuit for multiplying a signal generated by said interpolating circuit with a feedback signal; a phase detection circuit for detecting a phase of a signal output from said multiplying circuit and generating a phase signal; a second filter for removing a high-band component of said phase signal; and a numerical control circuit for generating said feedback signal having the oscillation frequency in accordance with said phase signal from which the high-band component was removed.

The mode of operation of the carrier reproducing apparatus according to the second aspect of the present invention is as follows.

The A/D conversion circuit samples the received signal at a frequency of at least n (n>2) times the symbol rate of the modulation.

Next, the first filter circuit filters out adjacent carriers from the sampled received signal.

Then, the down sampling circuit thins the filtered signal.

Then, the interpolation circuit interpolates by the thinned signal to generate a signal having a frequency of n times the symbol rate, The generated signal is processed in the feedback group.

In the feedback group, the multiplying circuit multiplies the signal with a feedback signal, the phase detection circuit detects a phase of the signal output from the multiplying circuit and generates a phase signal, the second filter circuit filters out the high-band component of the phase signal, and the numerical control circuit generates the feedback signal having an oscillation frequency corresponding to the phase signal from which the high band component was filtered out.

According to the carrier reproducing apparatus of the second aspect of the present invention, the operating frequency of the second filter circuit can be made lower than the operating frequency of the A/D conversion circuit and the second filter circuit can be made simple and small in size.

Preferably, the apparatus further comprises a second multiplying circuit for multiplying said sampled received signal with a second feedback signal when assuming said feedback signal is a first feedback signal and said multiplying circuit is a first multiplying circuit; a lock detection circuit for detecting a locked state of the signal output from said second multiplying circuit based on said phase signal; a second numerical control oscillation circuit for generating said second feedback signal having an oscillation frequency in accordance with a third signal; and a tracking circuit for controlling said third signal so that the output from said second filter circuit does not exceed a predetermined value when a phase of a signal output from said first multiplying circuit is locked and the output of said second filter circuit exceeds said predetermined value.

According to a third aspect of the present invention, there is provided a carrier reproducing method for reproducing a carrier of a received signal, including the steps of multiplying the received signal with a first feedback signal; filtering a signal output from said first multiplication to remove a signal component having a frequency adjacent to carrier frequency; multiplying said filtered signal with a second feedback signal; detecting a phase of a signal output from said second multiplication and generating a phase signal; generating said second feedback signal having an oscillation frequency in accordance with said phase signal; detecting a locked state of a phase of the signal obtained by said second multiplication based on said phase signal; generating said first feedback signal having an oscillation frequency in accordance with a third signal; and controlling said third signal so that said phase signal does not exceed a predetermined value when a phase of the signal obtained by said second multiplication is locked and the phase signal exceeds said predetermined value.

According to a fourth aspect of the present invention, there is provided a carrier reproducing method for reproducing a carrier of a modulated received signal, including the steps of sampling said received signal at a frequency of at least n (n>2) times a symbol rate of said modulation; filtering said sampled received signal; thinning said filtered signal to remove a signal component having a frequency adjacent to carrier frequency; interpolating using said thinned signal to generate a signal having a sampling frequency of 2 times said symbol rate; multiplying said interpolated signal and a feedback signal; detecting a phase of a signal obtained by said multiplication and generating a phase signal; removing a high-band component of said phase signal; and generating said feedback signal having an oscillation frequency in accordance with said phase signal from which the high-band component was removed.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments of a demodulation apparatus according to an embodiment of the present invention will be explained.

Figure 1:
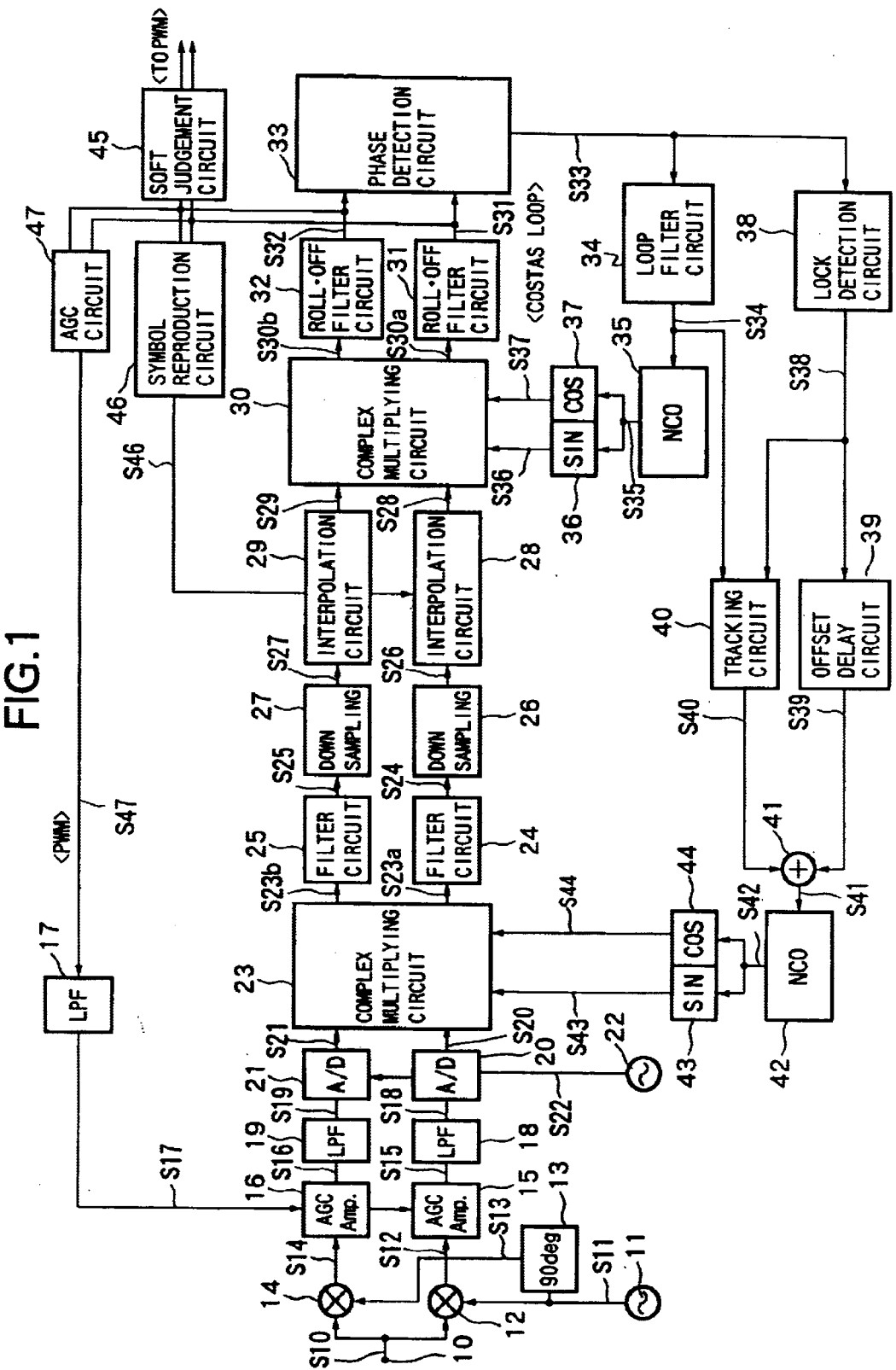
FIG. 1 is a view of the configuration of a demodulation apparatus of an embodiment of the present invention.

FIG. 1 is a view of the configuration of a demodulation apparatus 1 of the present embodiment.

The demodulation apparatus 1 is used in a receiving apparatus which receives an SCPC or other signal modulated at a low symbol rate of about several MSPS via a satellite relay and demodulates etc. the received signal.

As shown in FIG. 1, the demodulation apparatus 1 comprises for example an input terminal 10, a local oscillation circuit 11, an in-phase detection circuit 12, a phase shift circuit 13, a quadrature detection circuit 14, amplifying circuits 15 and 16, LPF circuits 17, 18, and 19, A/D conversion circuits 20 and 21, an oscillation circuit 22, a complex multiplying circuit 23, filter circuits 24 and 25, down sampling circuits 26 and 27, interpolation circuits 28 and 29, a complex multiplying circuit 30, roll-off filter circuits 31 and 32, a phase detection circuit 33, a loop filter circuit 34, a numerical control oscillation circuit 35, signal conversion circuits 36 and 37, a lock detection circuit 38, an offset setting circuit 39, a tracking circuit 40, an adding circuit 41, a numerical control oscillation circuit 42, signal conversion circuits 43 and 44, a soft judgement circuit 45, a symbol reproduction circuit 46, and an automatic gain control (AGC) circuit 47.

Here, the components except the soft judgement circuit 45 among those of the demodulation apparatus 1 comprise a carrier reproducing apparatus.

Below, the correspondence of the components of the claims of the present invention and the components shown in FIG. 1 will be explained.

In claim 1, the first multiplying circuit corresponds to the complex multiplying circuit 23, the first filter corresponds to the filter circuits 24 and 25, the second multiplying circuit corresponds to the complex multiplying circuit 30, the phase detection circuit corresponds to the phase detection circuit 33, the first numerical control circuit corresponds to the numerical control oscillation circuit 35 and the signal generation circuits 36 and 37, the lock detection circuit corresponds to the lock detection circuit 38, the second numerical control circuit corresponds to the numerical control oscillation circuit 42 and the signal generation circuits 43 and 44, and the tracking circuit corresponds to the tracking circuit 40.

Also, the loop filter circuit in claim 2 corresponds to the loop filter circuit 34.

The offset setting circuit in claim 4 corresponds to the offset setting circuit 39.

In claim 8, the A/D conversion circuit corresponds to the A/D conversion circuits 20 and 21, the first filter circuit corresponds to the filter circuits 24 and 25, the down sampling circuit corresponds to the down sampling circuits 26 and 27, the interpolation circuit corresponds to the interpolation circuits 28 and 29, the multiplying circuit corresponds to the complex multiplying circuit 30, the second filter circuit corresponds to the loop filter circuit 34, and the numerical control circuit corresponds to the numerical control oscillation circuit 35 and signal generation circuits 36 and 37.

The local oscillation circuit 11 generates an intermediate frequency local oscillation signal S11 and then outputs the same to the in-phase detection circuit 12 and phase shift circuit 13.

The in-phase detection circuit 12 multiplies the local oscillation signal S11 and a QPSK modulated intermediate frequency received signal S10 input from an input terminal 10 to detect in-phase components, generate a baseband I-signal S12, and then outputs the same to the amplifying circuit 15.

The phase shift circuit 13 shifts the phase of the local oscillation signal S11 from the local oscillation circuit 11 by 90 degrees to generate a local oscillation signal S13 and then outputs the same to the quadrature detection circuit 14.

The quadrature detection circuit 14 multiplies the local oscillation signal S13 with the QPSK modulated received signal S10 input from the input terminal 10 to detect quadrature components, generate a baseband Q-signal S14 and then outputs the same to the amplifying circuit 16.

The amplifying circuit 15 amplifies the I-signal S12 based on a pulse width modulation (PWM) signal from the LPF circuit to generate an I-signal S15 and then outputs the same to the LPF circuit 18.

The amplifying circuit 16 amplifies the Q-signal S14 based on the PWM signal S17 from the LPF circuit 17 to generate a Q-signal S16 and then outputs the same to the LPF circuit 19.

The LPF circuit 18 filters out the high-band component of the I-signal S15 to generate an I-signal S18 and then outputs the same to the A/D conversion circuit 20.

The LPF circuit 19 filters out the high-band component of the Q-signal S16 to generate a Q-signal S19 and then outputs the same to the A/D conversion circuit 21.

The oscillation circuit 22 generates an oscillation signal S22 having the same frequency as a predetermined sampling frequency of the received signal S10 and outputs the same to the A/D conversion circuits 20 and 21.

Here, the sampling frequency is made larger than twice the symbol rate Rs for the convenience of symbol timing reproduction (carrier reproduction). Also, to deal with a symbol rate of about 1 to 30 MSPS without switching the filter circuit and the oscillation circuit 22, the sampling frequency is made 60 MHZ or more.

The A/D conversion circuit 20 converts the I-signal S18 from an analog to digital format to generate a digital I-signal S20 and then outputs the same to the complex multiplying circuit 23.

The A/D conversion circuit 21 converts the Q-signal S19 from an analog to digital format to generate a digital Q-signal S21 and then outputs the same to the complex multiplying circuit 23.

Here, the A/D conversion circuits 20 and 21 operate based on the oscillation signal S22 from the oscillation circuit 22 and perform sampling at a frequency not depending on the symbol rate Rs.

The complex multiplying circuit 23 uses carrier reproduction signals S43 and S44 (for frequency pull-in and phase synchronization) from the signal conversion circuits 43 and 44, performs frequency pull-in and phase synchronization on the I-signal S20 and Q-signal S21 based on the formula (1) below, and outputs an I-signal S23a to the filter circuit 24 and a Q-signal S23b to the filter circuit 25.

Here, the signals S43 and S44 correspond to the first feedback signal in claim 1.

$$\begin{pmatrix} I'(S30a) \\ Q'(S30b) \end{pmatrix} = \begin{pmatrix} \cos\omega t & -\sin\omega t \\ \sin\omega t & \cos\omega t \end{pmatrix} \begin{pmatrix} I(S20) \\ Q(S28) \end{pmatrix} \quad (1)$$

Figure 2:
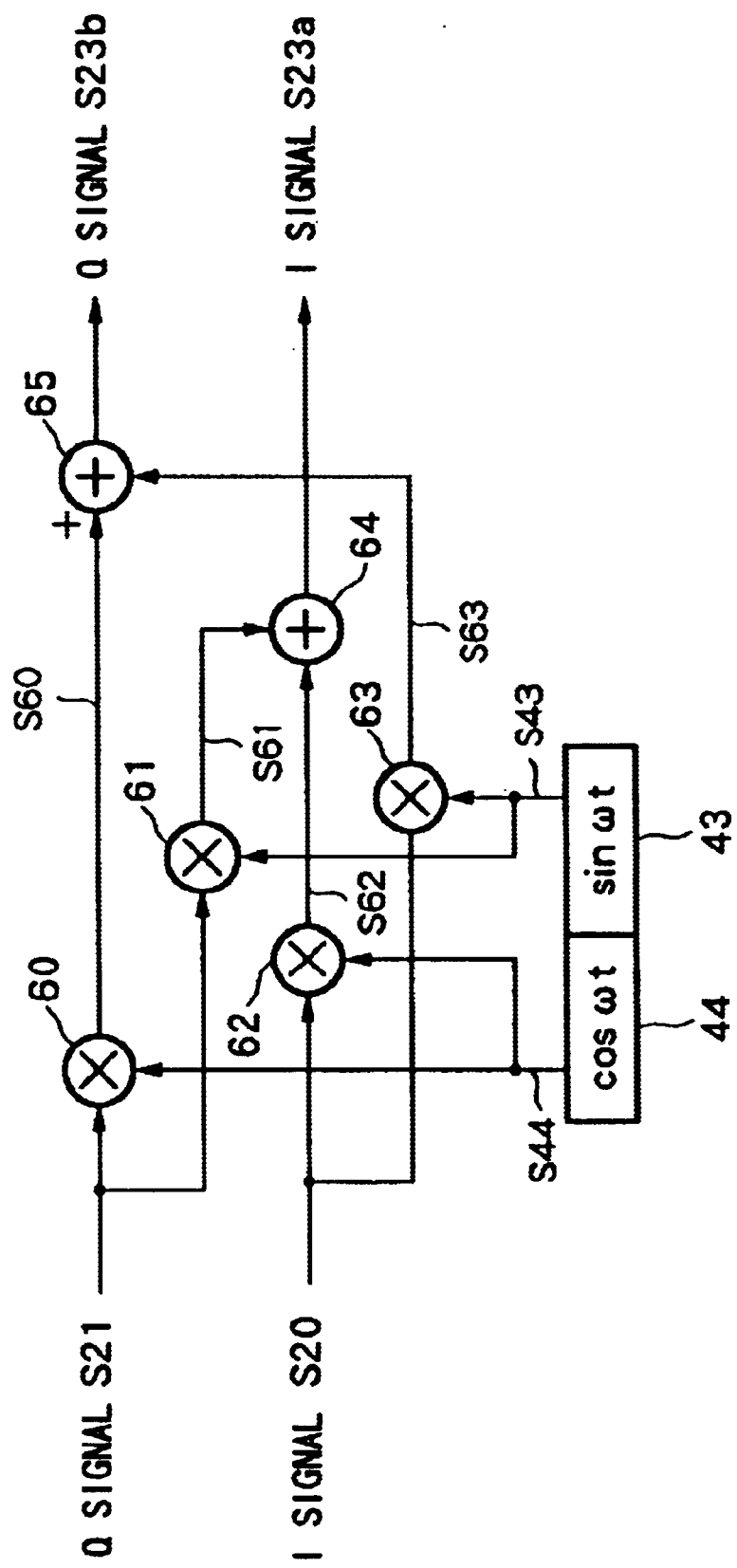
FIG. 2 is a view of the configuration of a complex multiplying circuit shown in FIG. 1.

FIG. 2 is a view of the configuration of the complex multiplying circuit 23.

As shown in FIG. 2, the complex multiplying circuit 23 comprises multiplying circuits 60, 61, 62, and 63 and adding circuits 64 and 65.

In the complex multiplying circuit 23, the Q-signal S21 from the A/D conversion circuit 21 shown in FIG. 1 is input to the multiplying circuits 60 and 61.

Also, the I-signal S20 from the A/D conversion circuit 20 shown in FIG. 1 is input to the multiplying circuits 62 and 63.

Further, a SIN characteristic signal S43 from the signal conversion circuit 43 is output to the multiplying circuits 61 and 63.

A COS characteristic signal S44 from the signal conversion circuit 44 is output to the multiplying circuits 60 and 62.

The multiplying circuit 60 multiplies the Q-signal S21 with the signal S44 and outputs a signal S60 of the multiplication result to the adding circuit 65.

The multiplying circuit 61 multiplies the Q-signal S21 with the signal S43 and outputs a signal S61 of the multiplication result to the adding circuit 64.

The multiplying circuit 62 multiplies the I-signal S20 with the signal S44 and outputs a signal S62 of the multiplication result to the adding circuit 64.

The multiplying circuit 63 multiplies the I-signal S20 with the signal S43 and outputs a signal S63 of the multiplication result to the adding circuit 65.

The adding circuit 65 subtracts the signal S63 from the signal S60. The subtracted result becomes the Q-signal S23b.

The adding circuit 64 adds the signal S61 and the signal S62. The added result becomes the I-signal S23a.

The filter circuit 24 filters out adjacent carrier components by low-pass filtering of the I-signal S23a to generate an I-signal S24 and then outputs the same to the down sampling circuit 26.

The filter circuit 25 filters out adjacent carrier components by low-pass filtering of the Q-signal S23b to generate a Q-signal S25 and then outputs the same to the down sampling circuit 27.

The filter circuits 24 and 25 operate at the sampling frequency.

The down sampling circuit 26 thins the I-signal S24 of a sampling frequency of 60 MHZ to generate an I-signal S26 of a sampling frequency of 30 MHZ and then outputs the same to the interpolation circuit 28.

The down sampling circuit 27 thins the Q-signal S25 having a sampling frequency of 60 MHZ to generate a Q-signal S27 of a sampling frequency of 30 MHZ and then outputs the same to the interpolation circuit 29.

The interpolation circuit 28, based on the symbol reproduction signal S46 from the symbol reproduction circuit 46, interpolates using the I-signal S26 having a sampling frequency of 30 MHZ so as to obtain a symbol at a required timing, to generate an I-signal S28 having a sampling frequency of 8 MHZ and then outputs the same to the complex multiplying circuit 30.

The interpolation circuit 29, based on the symbol reproduction signal S46 from the symbol reproduction circuit 46, interpolates using the Q-signal S27 having a sampling frequency of 30 MHZ so as to obtain a symbol at a required timing, to generate a Q-signal S29 having a sampling frequency of 8 MHZ and then outputs the same to the complex multiplying circuit 30.

The complex multiplying circuit 30, based on the carrier reproduction signals S36 and S37 (for frequency pull-in and phase synchronization) from the signal conversion circuits 36 and 37, performs frequency pull-in and phase synchronization on the I-signal S30a and the Q-signal S30b to generate an I-signal S30a and Q-signal S30b and outputs the I-signal S30a to the low-pass filter circuit 31 and the Q-signal S30b to the roll-off filter circuit 32.

Here, the signals S36 and S37 correspond to the second feedback signal of the present invention.

The roll-off filter circuit 31 filters the I-signal S30a to reduce intersymbol interference to generate an I-signal S31 which it then outputs to the phase detection circuit 33, soft judgement circuit 45, symbol reproduction circuit 46, and AGC circuit 47.

The roll-off filter circuit 32 filters the Q-signal S30b to reduce intersymbol interference to generate a Q-signal S32 which it then outputs to the phase detection circuit 33, soft judgement circuit 45, symbol reproduction circuit 46, and AGC circuit 47.

Note that while an example of configuring the roll-off filter circuits 31 and 32 in a Costas loop was explained in the present embodiment, but they may also be arranged immediately after the interpolation circuits 28 and 29.

The phase detection circuit 33 detects the phase determined by the I-signal S31 and the Q-signal S32 and outputs a phase signal S33 indicating the phase to the loop filter circuit 34 and the lock detection circuit 38.

The loop filter circuit 34 filters out the high-band component of the phase signal S33 to generate a phase signal S34 and then outputs the same to the numerical control oscillation circuit 35 and the tracking circuit 40.

The numerical control oscillation circuit 35 is summing circuit not prohibiting overflowing, enters an oscillating state by performing an adding operation up to its dynamic range in accordance with a value of the phase signal S34, generates a signal S35 having an oscillation frequency in accordance with a value of the phase signal S34, and outputs this to the signal conversion circuits 36 and 37. Namely, the numerical control oscillation circuit 35 performs digitally the same operation as a voltage controlled oscillation circuit (VCO) in an analog circuit.

The numerical control oscillation circuit 35 has basically the same configuration as that of a numerical control oscillation circuit 42 which will be explained later on.

The signal conversion circuit 36 comprises a ROM for storing a signal having a SIN characteristic and outputs a SIN characteristic signal S36 read from the ROM in accordance with the signal S35 from the numerical control oscillation circuit 35.

The signal conversion circuit 37 comprises a ROM for storing a signal having a COS characteristic and outputs a COS characteristic signal S37 read from the ROM in accordance with the signal S35 from the numerical control oscillation circuit 35.

Here, the complex multiplying circuit 30, the roll-off filter circuits 31 and 32, the phase detection circuit 33, the loop filter circuit 34, the numerical control oscillation circuit 35, and the signal conversion circuits 36 and 37 constitute a Costas loop circuit.

In the present embodiment, the frequency pull-in range by the Costas loop is ±Rs/8. This becomes ±500 kHz when the symbol rate Rs is 4 MSPS. Accordingly, the frequency pull-in only by the above Costas loop is not sufficient for a satellite receiving system.

The lock detection circuit 38 detects whether or not the phase synchronization by the above Costas loop is locked based on the phase signal S33 and outputs a lock detection signal S38 indicating the detection result to the offset setting circuit 39 and the tracking circuit 40.

The offset setting circuit 39 outputs to the adding circuit 41 an offset signal S39 indicating an offset value proportional to a predetermined symbol rate, such as ±Rs/4 or ±Rs/2, when the Costas loop is unlocked for example for a certain period after starting an operation for selecting a station based on a lock detection signal S38 from the lock detection circuit 38.

In the present embodiment, as explained above, since the frequency pull-in only by the Costas loop is not sufficient for a satellite receiving system, a frequency offset of 500 kHz or more is canceled in the complex multiplying circuit 23 in accordance with the offset signal S39 from the offset setting circuit 39 and the remaining frequency offset is pulled in by the above Costas loop. As a result, the pull-in range of the carrier appears to be expanded four times.

When the absolute value of the phase signal S35 from the loop filter circuit 34 exceeds a predetermined value when the above Costas loop is locked, the tracking circuit 40 generates a signal S40 indicating a value for reducing the absolute value of the phase signal S35, for example Rs/16, and outputs this to the adding circuit 41. The tracking circuit 40 outputs the signal S40 to the adding circuit 41 until the absolute value of the phase signal S35 becomes within the range of the above predetermined value.

Note that the tracking circuit 40 judges whether or not the Costas loop is locked based on the lock detection signal S38 from the lock detection circuit 38.

The above Costas loop can track drift of the carrier in a range of a value indicated by the phase signal S33 of −Rs to +Rs, but cannot track drift when the value indicated by the phase signal S33 exceeds the range such as at the time of a low symbol rate etc. This results in an unlocked state. The processing by the tracking circuit 40 is performed so as to prevent the unlocked state in advance. Specifically, the tracking circuit 40 generates a signal S40 so that the phase signal S41 is incremented or decremented every certain time in a direction reducing the absolute value of the phase signal S35.

The processing of the tracking circuit has the effect of enabling carrier reproducing processing to track changes in a local frequency of a down converter of a parabolic antenna over time due to a temperature change etc. after the frequency pull-in and the phase synchronization by the Costas loop is locked.

In the present embodiment, the offset setting circuit 39 and the tracking circuit 40 stores the values indicated by the offset signal S39 and the signal S40 as they are immediately before the unlocked state when the above Costas loop becomes unlocked due to an interruption of the received signal S10 or an operation of selecting another carrier, etc. By doing so, when the received signal S10 is recovered, the values held can be used by the offset setting circuit 39 and the tracking circuit 40 and the Costas loop can be locked in a short time.

The adding circuit 41 adds the offset signal S39 and the signal S40 from the tracking circuit 40 to generate a signal S41 and then outputs the same to the numerical control oscillation circuit 42.

The numerical control oscillation circuit 42 is a summing circuit not prohibiting overflow the same as the numerical control oscillation circuit 35, enters an oscillation state by performing an adding operation up to its dynamic range in accordance with the value of the signal S41, generates a signal S42 having the oscillation frequency in accordance with the value of the signal S41, and outputs this to the signal conversion circuits 43 and 44.

Figure 3:
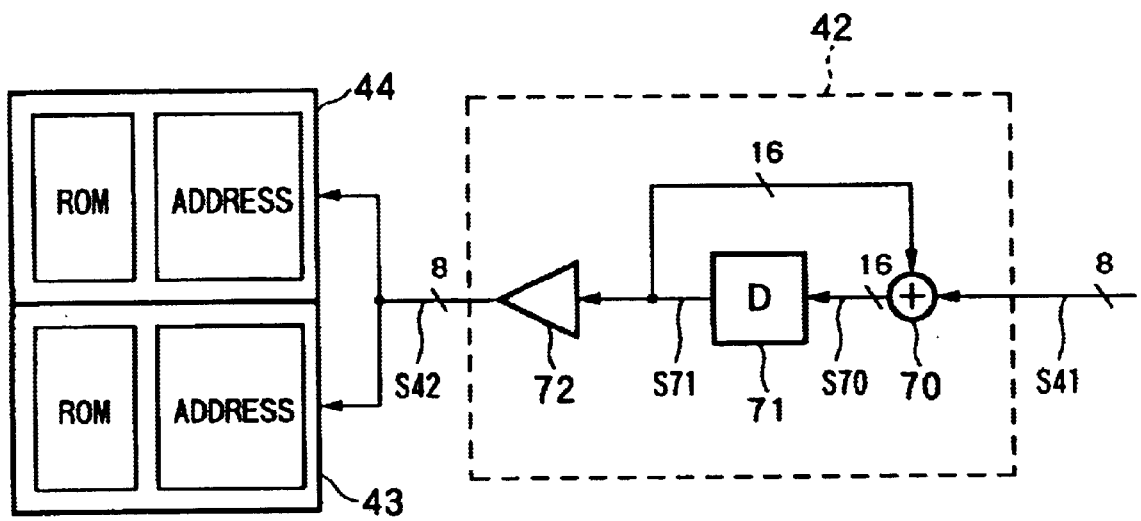
FIG. 3 is a view of the configuration of a numerical control oscillation circuit shown in FIG. 1.

FIG. 3 is a view of the configuration of the numerical control oscillation circuit 42.

As shown in FIG. 3, the numerical control oscillation circuit 42 comprises an adding circuit 70, a latch circuit 71, and an amplifying circuit 72.

In the numerical control oscillation circuit 42, the adding circuit 70 adds an 8-bit signal S41 input from the adding circuit 41 shown in FIG. 1 and a 16-bit signal S71 output from the latch circuit 71 to generate a 16-bit signal S70. The signal S70 is output to the latch circuit 71.

The latch circuit 71 delays the signal S70 exactly by one system clock cycle and outputs it as a signal S71 to the adding circuit 70 and the amplifier circuit 72.

The amplifying circuit 72 amplifies the 16-bit signal S71 by $2^{-8}$ times to generate the 8-bit signal S42.

The signal S42 is output to the signal conversion circuits 43 and 44.

Figure 4:
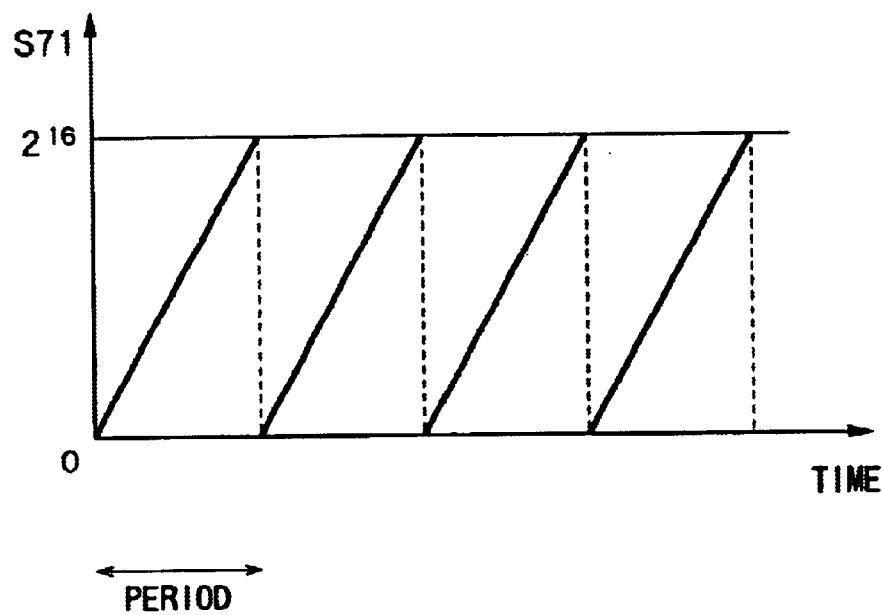
FIG. 4 is a view for explaining an operation of the numerical control oscillation circuit shown in FIG. 3 and shows changes of a value of a signal output from a latch circuit.

FIG. 4 is a view for explaining an operation of the numerical control oscillation circuit 42 and shows changes of the signal S71 output from the latch circuit 71.

As shown in FIG. 4, the latch circuit 71 makes the value of the signal S71 "0" when the signal S70 overflows. Also, the inclination of the signal S71 becomes larger and the period changes in accordance with the value of the signal S70, that is, in accordance with the value of the signal S41. Specifically, the larger the value of the signal S41, the shorter the period of the signal S71, that is, the higher the frequency. According to the numerical control oscillation circuit 42, a signal S42 having a frequency of up to ½ of a frequency of the system lock signal can be generated. The resolution of the frequency of the numerical control oscillation circuit 42 becomes (frequency of system lock signal)× $2^{-16}$.

The signal conversion circuit 43 comprises, as shown in FIG. 3, a ROM for storing an 8-bit resolution signal having a SIN characteristic and outputs the SIN characteristic signal S43 read from an address of the ROM in accordance with the signal S42 from the numerical control oscillation circuit 42 to the complex multiplying circuit 23.

The signal conversion circuit 44 comprises, as shown in FIG. 3, a ROM for storing an 8-bit resolution signal having a COS characteristic and outputs the COS characteristic signal S44 read from an address of the ROM in accordance with the signal S42 from the numerical control oscillation circuit 42 to the complex multiplying circuit 23.

The soft judgement circuit 45 makes a soft judgement of the I-signal S31 from the roll-off filter circuit 31 and the Q-signal S32 from the roll-off filter circuit 32 and outputs the result to a later error correction circuit. After the error correction, a reproduced signal is generated by using the I-signal and the Q-signal.

The symbol reproduction circuit 46 detects symbol timings of the I-signal S31 and Q-signal S32 from the roll-off filter circuits 31 and 32 and outputs a symbol reproduction signal S46 in accordance with the result to the interpolation circuits 28 and 29.

The AGC circuit 47 generates a PWM signal S47 based on the I-signal S31 and Q-signal S32 which it then outputs to the LPF circuit 17.

The LPF circuit 17 filters the PWM signal S47 by low-pass filtering to generate the PWM signal S17 which it then outputs to the AGC circuits 15 and 16.

The operation of the demodulation apparatus 1 will be explained below.

The in-phase components of a signal S10 received via a satellite relay are detected by the in-phase detection circuit 12 by using a local oscillation signal S11, whereupon a baseband I-signal S12 is generated.

The I-signal S12 is amplified in the amplifying circuit, filtered in the LPF circuit 18, and converted from an analog to digital format in the A/D conversion circuit 20 to generate an I-signal S20.

Also, at the same time, quadrature components of the received signal S10 are detected in the quadrature detection circuit 14 by using a local oscillation signal S13 having a 90-degree difference from the local oscillation signal S11, whereupon a baseband Q-signal S14 is generated.

The Q-signal S14 is amplified in the amplifying circuit 16, processed in the LPF circuit 19, and converted from an analog to digital format in the A/D conversion circuit 21 to generate a Q-signal S21.

Next, frequency pull-in and phase synchronization are performed on the I-signal S20 and Q-signal S21 by using carrier reproduction signals S43 and S44 (for frequency pull-in and phase synchronization) from the signal conversion circuits 43 and 44, whereupon the I-signal S23a and Q-signal S23b are generated in the complex multiplying circuit 23.

Next, the I-signal S23a is filtered in the filter circuit 24 by low pass filtering to filter out adjacent carrier components and generate the I-signal S24.

Also, the Q-signal S23b is filtered the filter circuit 25 by low passing filtering to filter out adjacent carrier components and generate the Q-signal S25.

The processing up to the filter circuits 24 and 25 is performed at a frequency of 60 MHZ or more which is as twice as much or more as the symbol rate Rs.

Then, the I-signal S24 having a sampling frequency of 60 MHz is thinned in the down sampling circuit 26, whereupon an I-signal S26 having a sampling frequency of 30 MHZ is generated.

Also, the Q-signal S25 having a sampling frequency of 60 MHz is thinned in the down sampling circuit 27, whereupon an Q-signal S27 having a sampling frequency of 30 MHZ is generated.

Next, based on the symbol reproduction signal S46 from the symbol reproduction circuit 46, interpolation is performed in the interpolation circuit 28 using the I-signal S26 having a sampling frequency of 30 MHZ so as to obtain a symbol at a required timing, whereupon an I-signal S28 having a sampling frequency of 8 MHZ is generated.

Also, based on the symbol reproduction signal S46 from the symbol reproduction circuit 46, interpolation is performed in the interpolation circuit 29 using the Q-signal S27 having a sampling frequency of 30 MHZ so as to be able to obtain a symbol at a required timing, whereupon a Q-signal S29 having a sampling frequency of 8 MHZ is generated.

Next, frequency pull-in and phase synchronization are performed on the I-signal S28 and Q-signal S29 by using carrier reproduction signals S36 and S37 (for frequency pull-in and phase synchronization) from the signal conversion circuits 36 and 37, whereupon an I-signal S30a and Q-signal S30b are generated in the complex multiplying circuit 30.

Then the roll-off filter circuit 31 filters the I-signal S30a so as to reduce intersymbol interference and generates an I-signal S31.

Also, the roll-off filter circuit 32 filters the Q-signal S30b so as to reduce intersymbol interference and generates a Q-signal S32.

Next, the phase detection circuit 33 detects the phase determined by the I-signal S31 and Q-signal S32 and outputs a phase signal S33 indicating the phase is the loop filter circuit 34 and the lock detection circuit 38.

Next, the loop filter circuit 34 flattens the phase signal S33 to generate a phase signal S34.

Then, the numerical control oscillation circuit 35 generates a signal S35 having an oscillation frequency in accordance with the value of the phase signal S34 and output it to the signal conversion circuits 36 and 37.

Consequently, a signal S36 having a SIN characteristic in accordance with the signal S35 and a signal S37 having a COS characteristic in accordance with the signal S35 are output from the signal conversion circuits 36 and 37 to the complex multiplying circuit 30.

Here, the Costas loop acts to pull in a frequency offset within ±500 kHz occurring in the I-signal S28 and Q-signal S29 by feedback of the phase signal S33 from the phase detection circuit 33.

Also, in the demodulation apparatus 1, the lock detection circuit 38 detects locking of the above processing of the Costas loop based on the phase signal S33 and outputs, when unlocked, a lock detection signal S38 indicating that to the offset setting circuit 39 and the tracking circuit 40.

Then, the offset setting circuit 39 outputs to the adding circuit 41 an offset signal S39 indicating an offset value proportional to a predetermined symbol rate, such as ±Rs/4 or ±Rs/2, when the Costas loop is not locked for example for a certain period after starting an operation for selecting a station based on a lock detection signal S38 from the lock detection circuit 38.

As a result, part of the frequency offset of 500 kHz present in the complex multiplying circuit 23 is canceled out and the remaining frequency offset can be suitably pulled in by the Costas loop.

Also, when above Costas loop is locked, the tracking circuit 40 generates a signal S40 indicating a value to reduce an absolute value of the phase signal S35 when the absolute value of the phase signal S35 from the loop filter circuit 34 exceeds a predetermined value such as Rs/16 and outputs the same to the adding circuit 41.

As a result, when the Costas loop is locked, it becomes possible to track carrier drift in the complex multiplying circuit 23 by a feedback loop including the tracking circuit 40, thus the Costas loop is effectively prevented from becoming unlocked.

As explained above, according to the demodulation apparatus 1, when the Costas loop becomes unlocked, the time for the Costas loop to be locked can be largely reduced by controlling the frequency pull-in and the phase synchronization in the complex multiplying circuit 23 in accordance with the offset signal S39 from the offset setting circuit 39.

Also, according to the demodulation apparatus 1, the Costas loop is effectively prevented from becoming unlocked by using the feedback loop including the tracking circuit 40.

Furthermore, the processing of the Costas loop can be stabilized by operating the feedback loop including the tracking circuit 40 conditional on the Costas loop being locked.

Namely, in the demodulation apparatuses of the related art, since the feedback control was performed unconditionally, it was performed even in a state where the Costas loop was unlocked and therefore frequency pull-in and phase synchronization sometimes became unstable in relation with the processing in the Costas loop. In the present embodiment, however, such a disadvantage can be solved.

Also, according to the demodulation apparatus 1, carrier drift can be tracked by the tracking circuit 40 while in a tracking range not depending on the symbol rate, and furthermore, a simple circuit can be realized.

According to the above demodulation apparatus 1, stable operation is possible even with a low S/N characteristic since a frequency detection circuit is not used as in a demodulation apparatus of the related art.

Also, in the above demodulation apparatus 1, the operation frequencies of the complex multiplying circuit 30 and on can be always made twice as much as the symbol rate Rs and can be made lower than those in the circuits of the filter circuits 25 and 26 and before by providing the down sampling circuits 26 and 27 and the interpolation circuits 28 and 29. As a result, the roll-off filter circuits 31 and 32 etc. can be made simple and small in size. Also, the roll-off filter circuits 31 and 32 can be operated at any symbol rate smaller than ½ of the sampling frequency without changing parts.

The present invention is not limited to the above embodiments.

For example, a case where a received signal was modulated by QPSK was explained in the above embodiment, however, the received signal may be modulated by BPSK or another phase modulation format.

The present invention may be configured not to use an external feedback loop. Specifically, in FIG. 1, it may be configured by removing the complex multiplying circuit 23, lock detection circuit 38, offset setting circuit 39, tracking circuit 40, adding circuit 41, numerical control oscillation circuit 42, and signal conversion circuits 43 and 44.

Summarizing the effects of the present invention, as explained above, a carrier reproducing apparatus and method enabling operation at a low S/N can be provided.

Also, according to the present invention, a carrier reproducing apparatus having a simple and small sized configuration and the method thereof can be provided.

While the invention has been described with reference to specific embodiment chosen for purpose of illustration, it should be apparent that numerous modifications could be made thereto by those skilled in the art without departing from the basic concept and scope of the invention.

What is claimed is:

1. A carrier reproducing apparatus for reproducing the carrier of a received signal, comprising:
   a first multiplying circuit for multiplying the received signal with a first feedback signal;
   a filter circuit for filtering the first multiplying circuit to remove a signal component having a frequency adjacent to carrier frequency;
   a second multiplying circuit for multiplying the filtered signal with a second feedback signal;
   a phase detection circuit for detecting a phase of a signal output from said second multiplying circuit and generating a phase signal;
   a first numerical control circuit for generating said second feedback signal having an oscillation frequency in accordance with said phase signal;
   a lock detection circuit for detecting a locked state of a phase of the signal output from said second multiplying circuit based on said phase signal;
   a second numerical control oscillation circuit for generating said first feedback signal having an oscillation frequency in accordance with a third signal; and
   a tracking circuit for controlling said third signal so that said phase signal does not exceed a predetermined value when a phase of the signal output from said second multiplying circuit is locked and the phase signal exceeds said predetermined value.

2. A carrier reproducing apparatus as set forth in claim 1, further comprising:
   a loop filter circuit for filtering out a high-band component of said phase signal
   and wherein
      said first numerical control circuit generates said second feedback signal having an oscillation frequency in accordance with the phase signal wherein the high-band component is removed; and
      said tracking circuit, when a phase of the signal output from said second multiplying circuit is locked and the phase signal wherein the high-band component is removed exceeds a predetermined value, controls said third signal so that the phase signal from which the high-band component was removed does not exceed said predetermined value.

3. A carrier reproducing apparatus as set forth in claim 1, wherein said tracking circuit increments or decrements a value indicated by said third signal.

4. A carrier reproducing apparatus as set forth in claim 1, further comprising an offset setting circuit for generating said third signal by using a predetermined offset value when a phase of the signal output from said second multiplying circuit becomes unlocked.

5. A carrier reproducing apparatus as set forth in claim 4, wherein when a phase of the signal output from said second multiplying circuit becomes unlocked to an interruption of said received signal or an operation for selecting a station, said offset setting circuit holds said offset value used immediately before the unlocked state and controls said third signal using said held offset value when said received signal is recovered or said operation for selecting a station is completed.

6. A carrier reproducing apparatus as set forth in claim 1, wherein when a phase of the signal output from said second multiplying circuit becomes unlocked due to an interruption of said received signal or an operation for selecting a station, said tracking circuit holds a control state of said third signal immediately before unlocking and controls said third signal based on said held control state when said received signal is recovered or said operation for selecting a station is completed.

7. A carrier reproducing apparatus as set forth in claim 1, further comprising an A/D conversion circuit for converting said received signal from an analog to digital format and wherein said first multiplying circuit multiplies said received signal after said A/D conversion with said first feedback signal.

8. A carrier reproducing apparatus for reproducing a carrier of a modulated received signal, comprising:

an A/D conversion circuit for sampling said received signal at a frequency of at least n (n>2) times a symbol rate of said modulation;

a first filter circuit for filtering said sampled received signal to remove a signal component having a frequency adjacent to carrier frequency;

a down sampling circuit for thinning said filtered signal;

an interpolation circuit for interpolating by said thinned signal to generate a signal having a frequency of n times said symbol rate;

a multiplying circuit for multiplying a signal generated by said interpolating circuit with a feedback signal;

a phase detection circuit for detecting a phase of a signal output from said multiplying circuit and generating a phase signal;

a second filter for removing a high-band component of said phase signal; and a numerical control circuit for generating said feedback signal having the oscillation frequency in accordance with said phase signal from which the high-band component was removed.

9. A carrier reproducing apparatus as set forth in claim 8, further comprising:

a second multiplying circuit for multiplying said sampled received signal with a second feedback signal when assuming said feedback signal is a first feedback signal and said multiplying circuit is a first multiplying circuit;

a lock detection circuit for detecting a locked state of the signal output from said second multiplying circuit based on said phase signal;

a second numerical control oscillation circuit for generating said second feedback signal having an oscillation frequency in accordance with a third signal; and a tracking circuit for controlling said third signal so that the output from said second filter circuit does not exceed a predetermined value when a phase of a signal output from said first multiplying circuit is locked and the output of said second filter circuit exceeds said predetermined value.

10. A carrier reproducing method for reproducing a carrier of a received signal, comprising the steps of:

multiplying the received signal with a first feedback signal;

filtering a signal output from said first multiplication to remove a signal component having a frequency adjacent to carrier frequency;

multiplying said filtered signal with a second feedback signal;

detecting a phase of a signal output from said second multiplication and generating a phase signal;

generating said second feedback signal having an oscillation frequency in accordance with said phase signal;

detecting a locked state of a phase of the signal obtained by said second multiplication based on said phase signal;

generating said first feedback signal having an oscillation frequency in accordance with a third signal; and controlling said third signal so that said phase signal does not exceed a predetermined value when a phase of the signal obtained by said second multiplication is locked and the phase signal exceeds said predetermined value.

11. A carrier reproducing method for reproducing a carrier of a modulated received signal, comprising the steps of:

sampling said received signal at a frequency of at least n (n>2) times a symbol rate of said modulation;

filtering said sampled received signal to remove a signal component having a frequency adjacent to carrier frequency;

thinning said filtered signal;

interpolating using said thinned signal to generate a signal having a sampling frequency of 2 times said symbol rate;

multiplying said interpolated signal and a feedback signal;

detecting a phase of a signal obtained by said multiplication and generating a phase signal;

removing a high-band component of said phase signal; and generating said feedback signal having an oscillation frequency in accordance with said phase signal from which the high-band component was removed.

* * * * *